(12) United States Patent
Xiao et al.

(10) Patent No.: US 10,747,833 B2
(45) Date of Patent: Aug. 18, 2020

(54) PERSONALIZED NEWS RECOMMENDATION ENGINE

(71) Applicant: NIO USA, Inc., San Jose, CA (US)

(72) Inventors: Fei Xiao, San Jose, CA (US);
Christopher Li, Sunnyvale, CA (US);
Zhou Xing, San Jose, CA (US);
Marzieh Parandehgheibi, San Jose, CA (US); Christopher F. Pouliot, San Mateo, CA (US); Nilesh V. Kulkarni, Saratoga, CA (US); Abhishek Singhal, Santa Clara, CA (US); Edward H. Baik, Mountain View, CA (US); Lisa E. Falkson, Los Altos, CA (US)

(73) Assignee: NIO USA, Inc., San Jose, CA (US)

( * ) Notice: Subject to any disclaimer, the term of this patent is extended or adjusted under 35 U.S.C. 154(b) by 311 days.

(21) Appl. No.: 15/797,775

(22) Filed: Oct. 30, 2017

(65) Prior Publication Data

US 2019/0130038 A1 May 2, 2019

(51) Int. Cl.
*G06F 16/00* (2019.01)
*G06F 16/9535* (2019.01)
*G06F 40/30* (2020.01)
*G06F 40/279* (2020.01)

(52) U.S. Cl.
CPC ........ *G06F 16/9535* (2019.01); *G06F 40/279* (2020.01); *G06F 40/30* (2020.01)

(58) Field of Classification Search
CPC ....................... G06F 17/30867; G06F 16/9535
USPC ....................................................... 707/709
See application file for complete search history.

(56) References Cited

U.S. PATENT DOCUMENTS

| | | |
|---|---|---|
| 2015/0278351 A1* | 10/2015 | Messina ................. G06F 16/48 707/749 |
| 2016/0012818 A1 | 1/2016 | Faizakof et al. |
| 2016/0232142 A1 | 8/2016 | Melnikov |
| 2016/0306877 A1 | 10/2016 | Winther |
| 2017/0228382 A1* | 8/2017 | Haviv ............... G06Q 30/0631 |

* cited by examiner

*Primary Examiner* — Apu M Mofiz
*Assistant Examiner* — Farhad Agharahimi
(74) *Attorney, Agent, or Firm* — Sheridan Ross P.C.

(57) ABSTRACT

A network crawler crawls one or more media sites to extract a plurality of titles for information contained in the one or more media sites. For example, the network crawler may extract the titles on the one or more media sites by identifying different computer formats and converting the titles in the different computer formats into a common computer format for comparison. User profiles which, includes user's interest are stored in a user profile interest database. A novel personalized news recommendation engine recommends news similar to the interest specified in a user profile, where maximum weighted matching is applied to score the similarity of news against user interest in the word2vec space.

20 Claims, 5 Drawing Sheets

PERSONALIZED NEWS RECOMMENDATION ENGINE

FIELD

The disclosure relates generally to network crawling systems and particularly to network crawling systems that capture information for personalized news recommendation engines.

BACKGROUND

With the advent of the Internet, the amount of information can be accessed is becoming difficult to manage. In order to classify the large amounts of information, personalized news recommendation engines use network crawling software and hardware that identifies a website and then classifies information in the website; this allows a personalized news recommendation engine to identify which websites match certain search criteria.

Moreover, because of the vast amounts of information on the Internet, crawling the Internet to identify specific types of information can very processor intensive, which may interfere with other processes associated with personalized news recommendation engines.

In addition, information that is on different websites is typically formatted in different computer formats that are specific to each website. For example, a title of documents one webpage may be in Extended Markup Language (XML) and the title of a second document may be in Portable Document Format (PDF). Moreover, the location of a title within the information on one webpage may be in a different location than a title on a second webpage. Because the format/location of information on different webpages may vary dramatically, this can cause problems when trying to identify specific types of information on a website, such as, a title of a document or a tile of a news story.

SUMMARY

These and other needs are addressed by the various embodiments and configurations of the present disclosure. A network crawler crawls one or more media sites to extract a plurality of titles for information contained in the one or more media sites. For example, the network crawler may extract the titles on the one or more media sites by identifying different computer formats and converting the titles in the different computer formats into a common computer format for comparison. User profiles, which include user's interests, are stored in a user profile interest database. A novel personalized news recommendation engine recommends news based on the interest specified in a user profile. The engine applies maximum weighted matching to score the similarity of news against user interest in the word2vec space.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
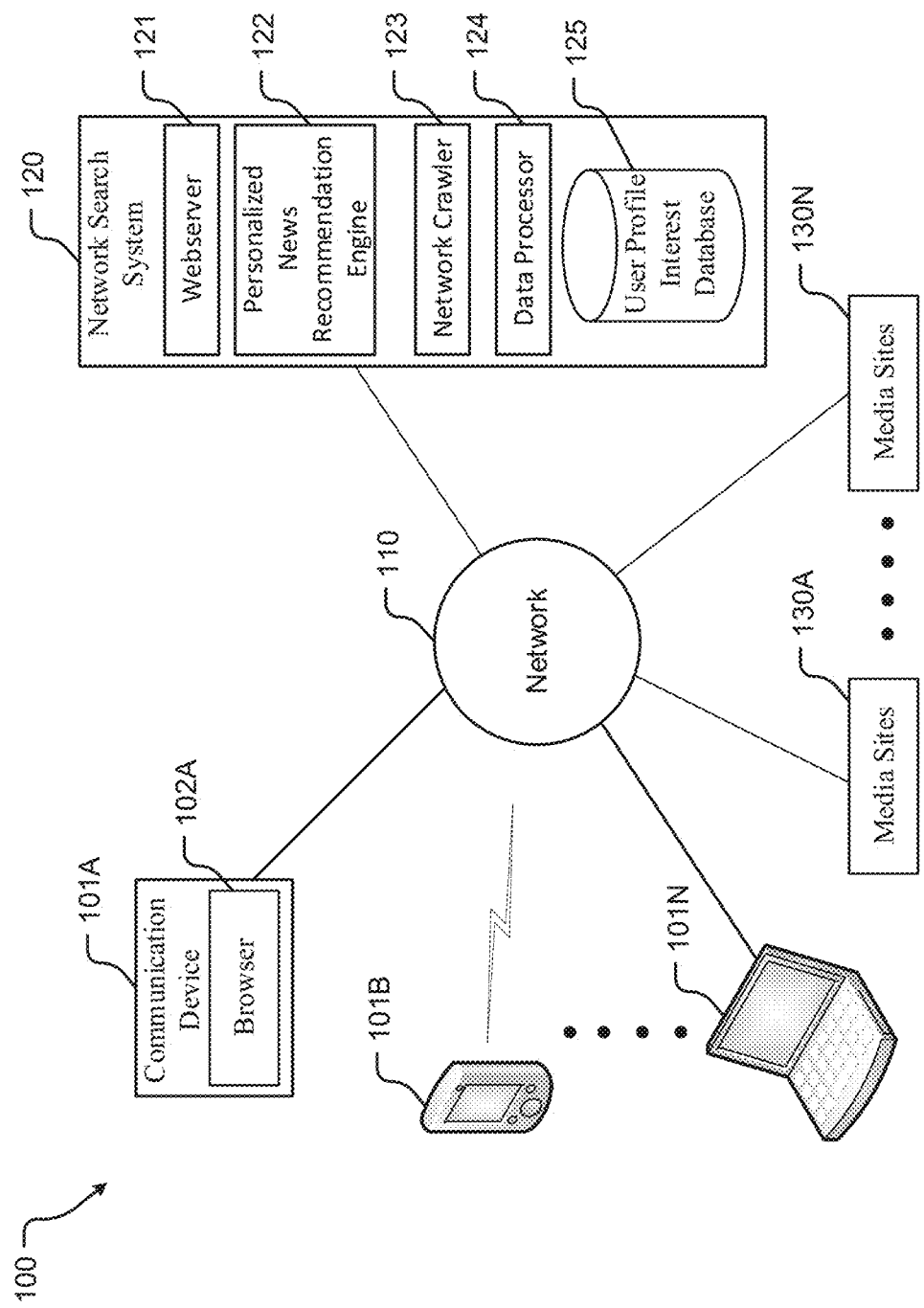
FIG. 1 is a block diagram of a first illustrative system for crawling media sites in a network to match search criteria from a personalized news recommendation engine.

FIG. 1 is a block diagram of a first illustrative system 100 for crawling media sites 130A-130N in a network 110 to match search criteria from a personalized news recommendation engine 122. The first illustrative system 100 comprises communication devices 101A-101N, a network 110, a network search system 120, and media sites 130A-130N.

The communication devices 101A-101N can be or may include any device that can communicate on the network 110 and request a network search, such as a Personal Computer (PC), a telephone, a video system, a cellular telephone, a Personal Digital Assistant (PDA), a tablet device, a notebook device, a smart phone, a server, a communication system, and/or the like. As shown in FIG. 1, any number of communication devices 101A-101N may be connected to the network 110, including only a single communication device 101.

The communication device 101A further comprises a browser 102A. The browser 102A can be any type of browser 102, such as, Firefox™, Google Chrome™, Opera™, Internet Explorer™, Safari™ and/or the like. The browser 102A is used to communicate with the webserver 121. Although not shown, the communication devices 101B-101N may also comprise the browser 102.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Hyper Text Markup Language (HTML), Web Real-time Communication (WebRTC) protocol, Java script, and the like. Thus, the network 110 is an electronic communication network configured to carry messages via packets and/or circuit switched communications.

The network search system 120 can be or may include any hardware coupled with software that can provide search services on the network 110, such as a server, a communication system, and/or the like. The network search system 120 further comprises a webserver 121, a personalized news recommendation engine 122, a network crawler 123, a data processor 124, and a user profile interest database 125.

The webserver 121 can be or may include any hardware/ software that can provide web services, such as, an Apache™ webserver, a Microsoft Internet Information Services™ server, a NGINX™ server, a Google GWS™ server, and/or the like. Users may communicate with the webserver 121 via the browser 102. For example, a user may enter a Uniform Resource Locator (URL) in the browser 102 and be provided a webpage by the webserver 121 that allows the user to invoke the personalized news recommendation engine 122.

The personalized news recommendation engine 122 can be or may include any hardware coupled with software that can search through data based on search criteria. For example, the personalized news recommendation engine 122 may search though data crawled from the media sites 130A-130N by the network crawler 123.

The network crawler 123 can be or may include any hardware coupled with software that can crawl the network 110 to identify information that is used as input to the data processor 124 and/or personalized news recommendation engine 122. In one embodiment, the network crawler 123 crawls the media sites 130A-130N. In FIG. 1, the network crawler 123 is shown located on the network search system 120. However, in another embodiment, the network crawler 123 may be on a separate server. For example, the network crawler 123, the data processor 124, and the user profile interest database 125 may be on a separate server. The network crawler 123 crawls the network 110 and provides the crawled information to the data processor 124 for later access by the personalized news recommendation engine 122.

In one embodiment, the network crawler 123 may comprise multiple network crawlers 123 on different servers that crawl different media sites 130. The output from the multiple network crawlers 123 may be stored in multiple user profile interest databases 125 that are accessed by the data processor 124.

The user profile interest database 125 can be or may include data stored in a non-transitory computer medium, such as a memory or disk. The user profile interest database 125 may be a relational user profile interest database, a file system, an object oriented user profile interest database, a directory service, and/or the like. The user profile interest database 125 may be a cluster of user profile interest database servers located on the network 110 that is external to the network search system 120.

In one embodiment, the network crawler 123 may run on a separate computer thread and/or computer core from the personalized news recommendation engine 122 and the data processor 124. For example, the network crawler 123 may use a separate computer core to crawl the network 110.

In one embodiment, the network crawler 123, the data processor 124, and the personalized news recommendation engine 122 each run on separate threads and/or computer cores. In this embodiment, the network crawler 123 (on a first thread/computer core) crawls the network 110 and stores the crawled information in the user profile interest database 125. The data processor 124 (on a second thread/computer core) process the crawled information to identify specific types of information (e.g., to identify specific types of titles of news media) and stores the results in the user profile interest database 125. The personalized news recommendation engine 122 (on a third thread/computer core) uses stored results from the data processor 124 and applies search criteria to identify specific information (e.g., specific news titles). The results are then displayed to a user.

The media sites 130A-130N may be or can include any hardware coupled with software that provide media services, such as a media server (e.g., a server that has a list of titles of moves/music), a news media site, a social media network (e.g., Facebook™), a media feed (e.g., Twitter™), a document server, a file server, a user profile interest database server, an archive server, and/or the like.

Figure 2:
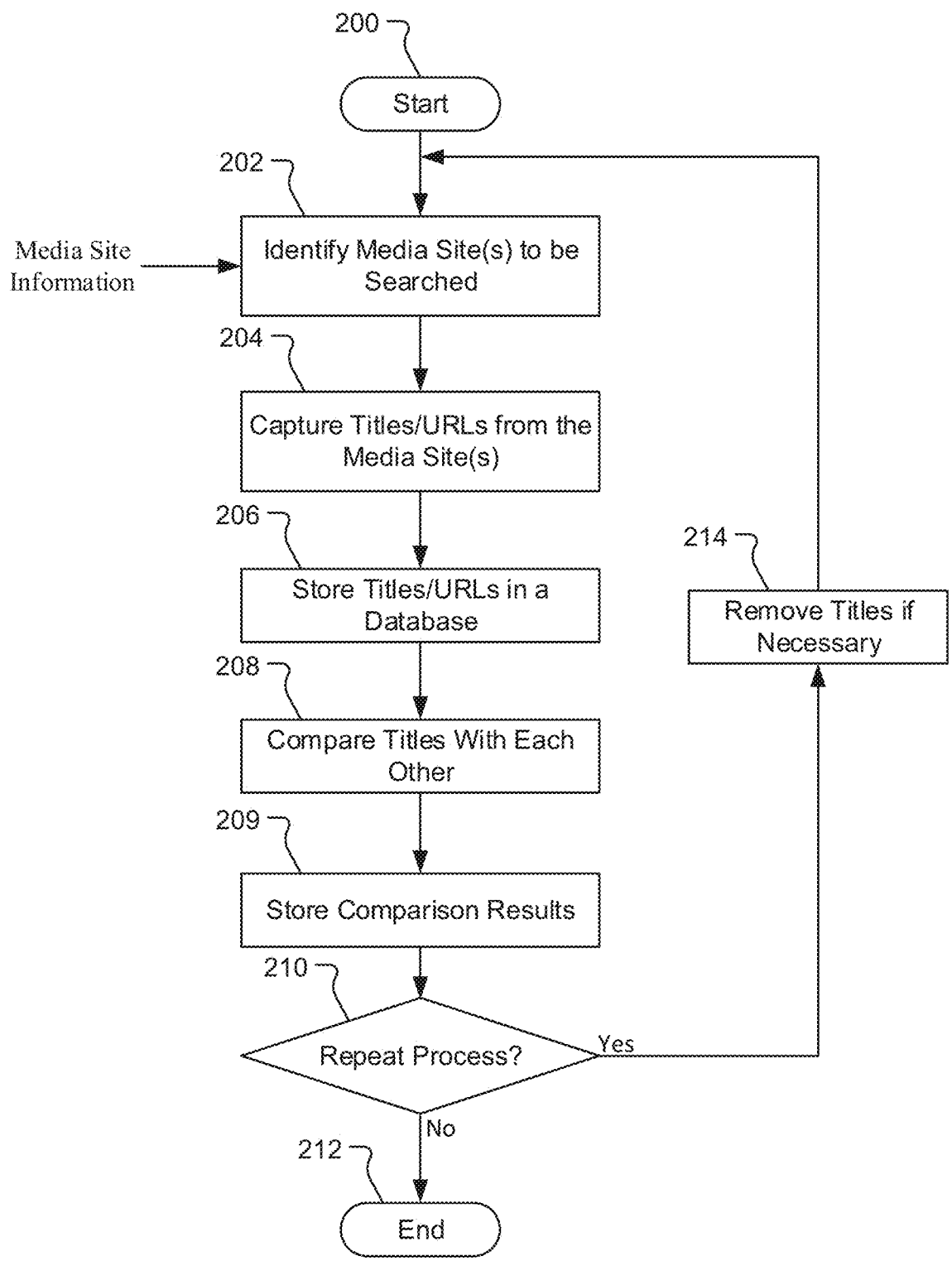
FIG. 2 is a flow diagram of a process for crawling media sites to capture title information contained in the media sites.

FIG. 2 is a flow diagram of a process for crawling media sites 130A-130N to capture title information contained in the media sites 130A-130N. Illustratively, communication devices 101A-101N, the browser 102, the network search system 120, the webserver 121, the personalized news recommendation engine 122, the network crawler 123, the data processor 124, the user profile interest database 125, and the media sites 130A-130N are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The network crawler 123 identifies one or more media sites 130A-130N to be searched in step 202. The network crawler 123 may identify the one or more media sites 130A-130N in various ways. For example, the network crawler 123 may receive input from a user (e.g., from a user interface) that specifies which media sites 130 to crawl. Alternatively, the network crawler 123 may search the media sites 130A-130N based on a defined list of media sites, based on crawling a media site 130 and determining if the media site 130 has titles, based on specific Internet Protocol (IP) addresses, based on a location (e.g., local media sites 130), based on information in a domain name (e.g., all domain sites that have the word "news" in the domain name), and/or the like.

The network crawler 123 captures title(s) and a URL associated with the respective title in step 204. The URL is used to allow a user to link to the webpage associated with the identified title.

A title may be in various forms. For example, a title may be a sentence that is taken from a document, a webpage, a media feed, and/or the like. The title may be a title of a document, a title of a news report, a title of a movie, a title of a piece of music, and/or the like. A title may be identified from a list of titles. For example, the network crawler 123 may identify a list of documents, a list of music titles, a list of videos, a list of television shows, a list of videos, a list of new reports, and/or the like.

The title may be identified based on a link (e.g., a URL) pointing to a document. For example, the URL www.companyx.com/news/newstory_hurricane_harvy may be used to identify a title (newstory_hurricane_harvey). In this example, the network crawler 123 uses the first portion of the URL "www.companyx.com/news" as a basis for identifying different news stories (e.g. www.companyx.com/news/newstory_fire_in_newyork) that use the same first portion of the URL to point to a second title.

In addition to the title(s)/URL(s), other information about the title/URL may be captured. For example, a short description of the title may be captured in step 204.

In one embodiment, the captured titles from the media sites 130 may be filtered. For example, news titles that are over two weeks old may be filtered out from the captured titles.

The network crawler 123 stores the title(s) in the user profile interest database 125 along with the respective URL that points to the title in step 206. For example, if the title is for a new news story, the URL points to the new story.

The data processor 124 compares the titles in the user profile interest database 125 in step 208. The data processor 124 compares the titles to each other to determine a similarity between compared titles. The comparison results are then stored in the user profile interest database 125 in step 209.

The network crawler 123 determines if there are additional media sites 130 to be crawled in step 210 (repeat the process). For example, the network crawler 123 may periodically search (e.g., every five minutes) the same media sites 130 to find new titles that may be published on the media sites 130 (e.g., breaking news stories). If the network crawler 123 determines there are not any media sites 130 to be searched in step 210 the process ends in step 212.

Otherwise, if the process is to repeat in step 210, the data processor 124 determines, in step 214, if any titles need to be removed from the user profile interest database 125. For example, a title may be outdated, is no longer relevant, or the URL may have been removed from the media site 130 (i.e., by testing the URLs). The data processor 124 may periodically remove titles so that only current news articles are searched. The process then goes to step 202.

Figure 3:
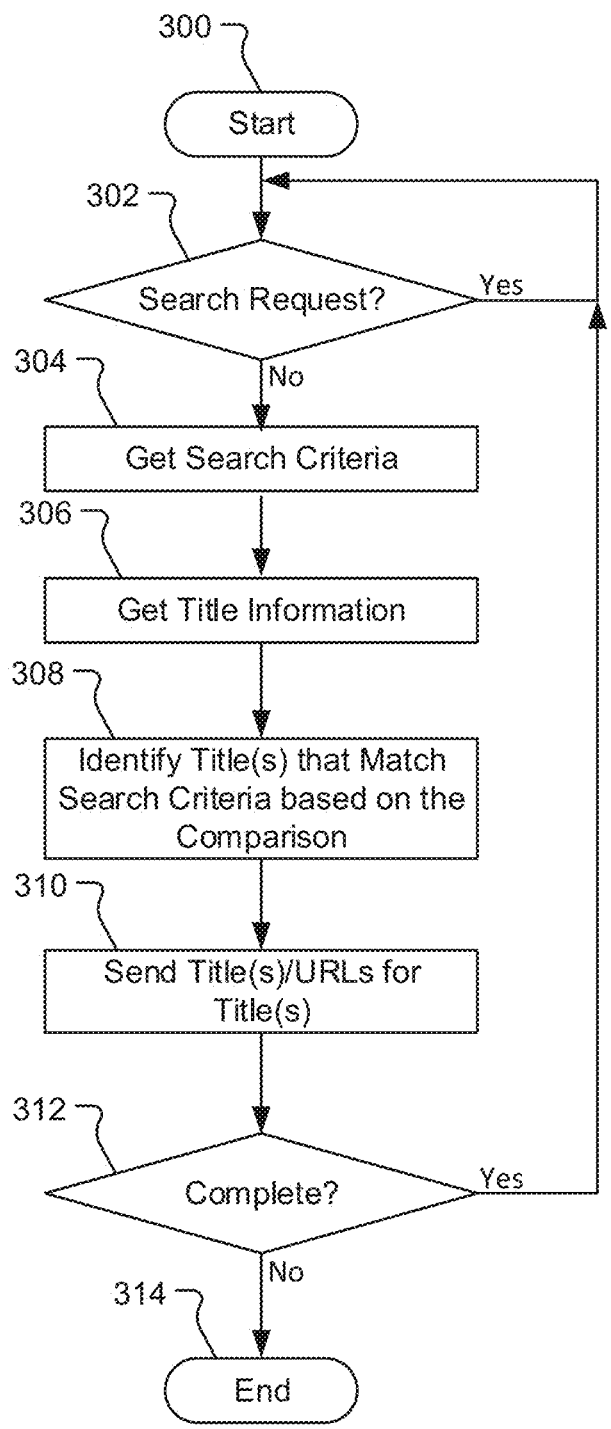
FIG. 3 is a flow diagram of a process for processing a search request in a personalized news recommendation engine to identify media sites that match the search request.

FIG. 3 is a flow diagram of a process for processing a search request in a personalized news recommendation engine 122 to identify media sites 130 that match the search request. After the process of FIG. 2 has completed at least once (e.g., on a different thread), the process of FIG. 3 starts in step 300. The personalized news recommendation engine 122 determines, in step 302, if a search request has been received. For example, a user may define search criteria, from the browser 102, that the user wants to be notified of new stories regarding a football, basketball, and articles for a specific city.

If a search request has not been requested in step 302, the process repeats step 302. Otherwise, if a search request has been initiated by the user (or an application), the personalized news recommendation engine 122 gets the search criteria in step 304 (e.g., football). The personalized news recommendation engine 122 gets, in step 306, the title information that was compared and stored in steps 208/209. The personalized news recommendation engine 122 uses an algorithm to compare the output from step 208 (where the titles are compared to each other) to identify one or more titles that match or are closely related (or none if there is not a match) to the search criteria in step 308. For example, a maximum weighted matching algorithm, such as, a Hungarian algorithm, a simplex algorithm, an auction algorithm, and/or the like may be used to search the identified titles from step 208 to determine which titles match the search criteria.

If one or more titles are identified in step 308, the personalized news recommendation engine 122 sends, in step 310, the one or more titles and the respective URL(s) to the user. For example, the personalized news recommendation engine 122 sends the one or more titles/URLs to the browser 102. This way the user can click on the associated URL to view the article associated with the selected title.

The personalized news recommendation engine 122 determines if the process is completed in step 312. If the process is not completed in step 312, the process goes to step 302. Otherwise, if the process is completed in step 312, the process ends in step 314.

In one embodiment, the search request may be a continuous search request. For instance, the process of FIG. 2 may periodically repeat with the same search criteria or updated search criteria. In this embodiment, the process of FIG. 3 will repeat with the same search criteria or with updated search criteria to identify titles that match the search request. In another embodiment, the search request may be a one-time request where the user only wants run a single search.

Figure 4:
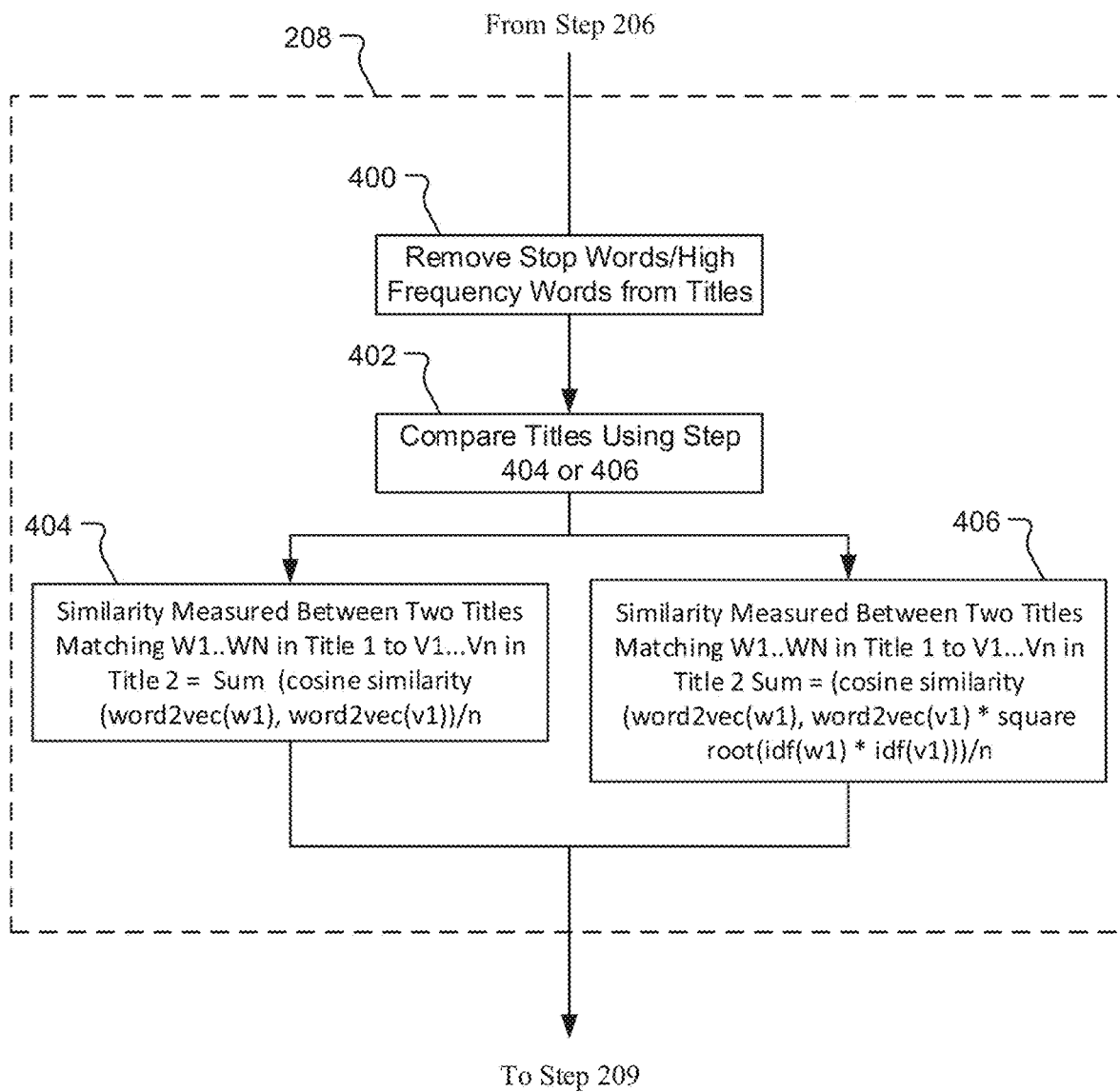
FIG. 4 is a flow diagram of a process for matching search criteria.

FIG. 4 is a flow diagram of a process for matching search criteria. The process of FIG. 4 is an exemplary, but not limiting embodiment of step 208 in FIG. 2. After the crawled titles have been stored in step 206, the data processor 124 implements a maximum weighted matching algorithm for a bipartite graph on a title.

To implement the algorithm, the data processor 124 removes, in step 400, stop words and/or high frequency words from the titles using an Inverse Document Frequency (IDF). Stop words/high frequency words are words that are most commonly used in a specific language. For example, if the language English, common stop words, such as, "the," "is," "at," "which," "on," and/or the like are removed in step 400. Likewise, for different languages, different stops words would be removed in step 400 according to the specific language. A user may define high frequency words based on a specific context. For example, if the search field (e.g., football) uses specific high frequency words that are not relevant to the search, the user can define specific words to be a stop words or high frequency words.

The data processor 124 compares, in step 402, the titles to each other using one of the algorithms defined in steps 404 or 406. For example, if there are three titles (title A, title B, and title C), the following comparisons would be made: A-B, A-C, and B-C in steps 404 and 406.

In step 404, the data processor 124 applies a minimum cost flow maximum algorithm to find the maximum sum weighted match between two titles. This assumes that the algorithm matched word 1, word 2, . . . , word N in title 1 to vector 1, vector 2, . . . , vector N in title 2. The similarity of title 1 to title 2=Sum (cosine_similarity(word2vec(w1), word2vec(v1))/n where n is the number of words in the title (title 1 or title 2) that has the least number of words. In step 404, the number of words is after the stop words/high frequency words are removed from the two titles.

In step 406, the data processor 124 applies a minimum cost flow maximum algorithm to find the maximum sum weighted match between two titles. This assumes that the algorithm matched word 1, word 2, . . . , word N in title 1 to vector 1, vector 2, . . . , vector N in title 2. The IDF of the title similarity between title 1 and title 2=Sum (cosine_similarity(word2vec(w1), word2vec(v1)*square_root (IDF(w1)*IDF(v1)))/n where n is the number of words in the title (title 1 or title 2) that has the least number of words. In step 406, the number of words is after the stop words/high frequency words are removed from the two titles. After step 404 or step 406 has been completed, the process then goes to step 209.

Figure 5:
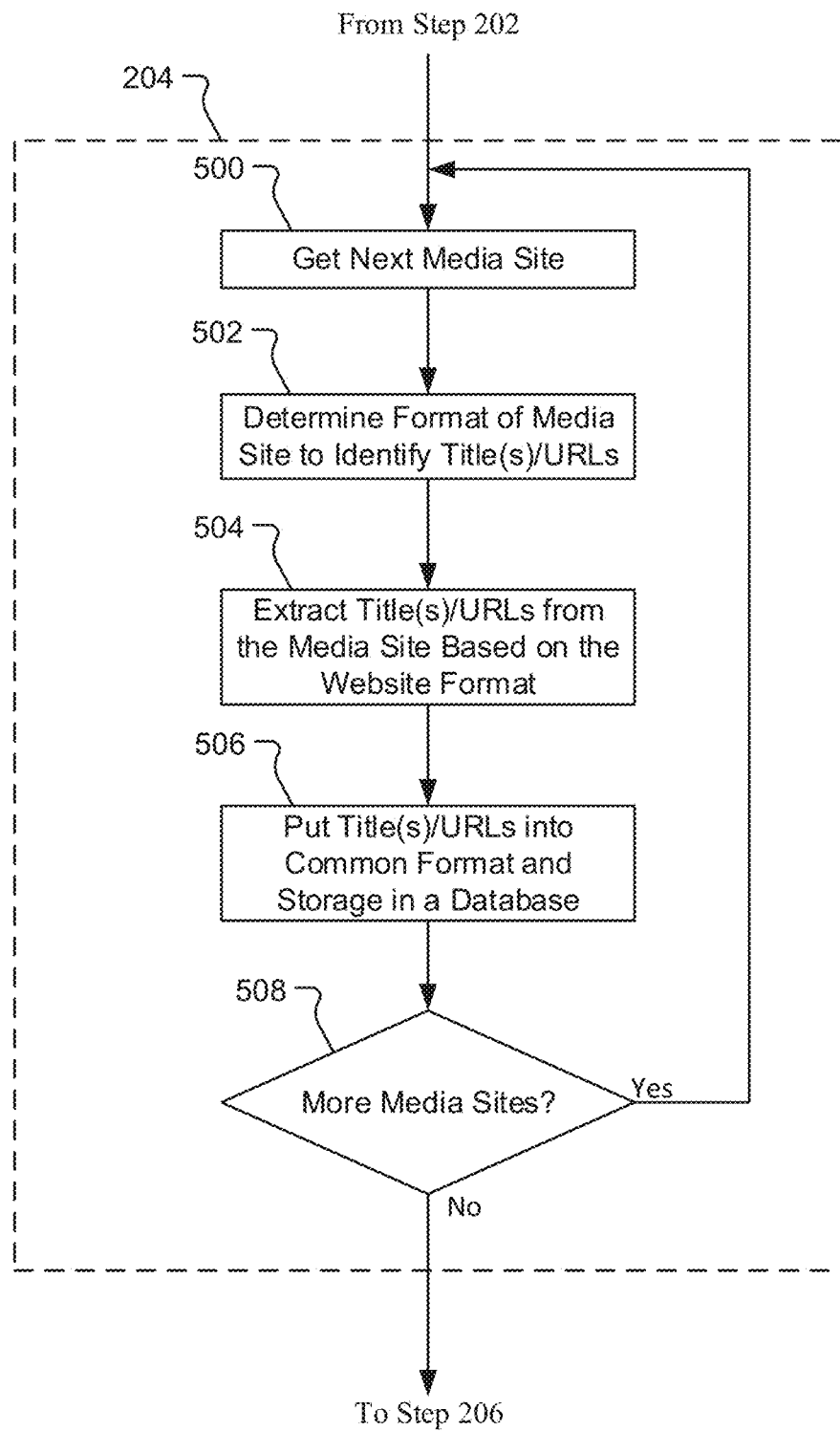
FIG. 5 is a flow diagram of a process for identifying information on media sites that are in different computer formats.

FIG. 5 is a flow diagram of a process for identifying information on media sites 130 that are in different computer formats. The process of FIG. 5 is an exemplary, but not limiting, expanded view of step 204 in FIG. 2. After identifying the media sites 130 to be searched in step 202, the network crawler 123 gets the next media site 130 in step 500.

The network crawler 123 determines the format of the media site 130 in step 502 to identify title(s)/URL(s). For example, the media site 130 may have an Application Programming Interface (API) that allows the network crawler 123 to extract the title and a URL associated with the title. In one embodiment, the network crawler 123 may identify a title on a particular web page based on an identifier (e.g., a tag) within the webpage. For example, the tile may be in the format <title>="Aftermath of Hurricane Harvey" located in the webpage. In a Microsoft Word™ document, a title can be identified in a specific format within the document. Likewise, in a Hyper Text Markup Language (HTML) webpage, a title may be searched for based on tags. For instance, HTML 5 defines various fields, such as, <header>, <article>, <summary> to identify information in the webpage. HTML 5 also defines the field <nav> where various navigation links (URLs) are defined. The network crawler 123 uses the various formats of the webpages to determine title(s)/URL(s) within a webpage. The network crawler 123 can use the format information to identify specific locations of the title(s)/URL(s) on the webpage.

In one embodiment, the network crawler 123 may have a predefined list of specific formats that are used to identify a title. Based on the list, the network crawler 123 determines how to search a specific webpage. The list may be learned over time.

The network crawler 123 extracts the title(s)/URL(s) from media site 130 based on the website format in step 504. The network crawler 123 can search different webpages that are on a website using well-known network crawling techniques. The network crawler 123 puts the title(s)/URL(s) into a common format for storage in the user profile interest database 125 in step 506. For example, the network crawler 123 may place the title(s)/URL(s) in an Extended Markup Language (XML) file for storage in the user profile interest database 125.

The network crawler 123 determines, in step 508, if there are more media sites 130 to be searched. If there are more media sites 130 to be searched in step 508, the process goes back to step 500. If there are not more media sites 130 to be searched in step 508, the process goes to step 206.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a system comprising:
a microprocessor; and
a computer readable medium, coupled with the microprocessor and comprising microprocessor readable and executable instructions that program the microprocessor to execute:
a network crawler that crawls one or more media sites to extract a plurality of titles for information contained in the one or more media sites.
a data processor that removes one or more stop words and/or high frequency words from the plurality of titles, applies a minimum cost flow maximum algorithm to find a maximum sum weighted match between the plurality of titles wherein:
a first group title similarity that is measured between the plurality of titles using a sum of a cosine of a word2vec of ordered words and a word2vec of vectors of the order words between the corresponding titles, divided by a total number of words in a corresponding title; or
a second group title similarity that is measured considering an inverse document frequency where title similarity is measured between the plurality of titles using the sum of a cosine of a word2vec of ordered words and a word2vec of vectors of the order words between the corresponding titles, times a square root of an inverse document frequency of the ordered words of the corresponding titles and an inverse document frequency of the vectors of the ordered words of the corresponding titles, divided by the total number of words in a corresponding title; and
a personalized news recommendation engine, based on the first group title similarity or the group second title similarity, that identifies one or more titles from the plurality of titles that match one or more search criteria and one or more Uniform Resource Locators (URLs) for the one or more identified titles.

Aspects of the above include a system, wherein the algorithm determines the first group title similarity.

Aspects of the above include a system, wherein the algorithm determines the second group title similarity.

Aspects of the above include a system, wherein the personalized news recommendation engine, based on the first group title similarity or the second group title similarity identifies the one or more titles using a maximum weighted matching algorithm.

Aspects of the above include a system, wherein the one or more media sites comprises a plurality of media sites and wherein the network crawler extracts the plurality of titles by determining a plurality of different formats of the plurality of media sites and stores the plurality of titles in a common format in a user profile interest database.

Aspects of the above include a system, wherein a user identifies at least one of the one or more media sites using a user interface.

Aspects of the above include a system, wherein the network crawler extracts the plurality of titles from the one or more media sites by searching for tags within documents that identify the plurality of titles.

Aspects of the above include a system, wherein the total number of words is a minimum number of words between two compared titles.

Aspects of the above include a system, wherein the network crawler runs on a separate computer thread and/or computer core from the data processor and the personalized news recommendation engine.

Aspects of the above include a system, wherein the data processor and the personalized news recommendation engine are both running on separate computer threads and/or computer cores.

Embodiments include a method comprising:
crawling, by a microprocessor, one or more media sites to extract a plurality of titles for information contained in the one or more media sites;
removing, by the microprocessor, one or more stop words and/or high frequency words from the plurality of titles;
applying, by the microprocessor, a minimum cost flow maximum algorithm to find a maximum sum weighted match between the plurality of titles wherein:
a first group title similarity that is measured between the plurality of titles using a sum of a cosine of a word2vec of ordered words and a word2vec of vectors of the order words between the corresponding titles, divided by a total number of words in a corresponding title; or a second group title similarity that is measured considering an inverse document frequency where title similarity is measured between the plurality of titles using the sum of a cosine of a word2vec of ordered words and a word2vec of vectors of the order words between the corresponding titles, times a square root of an inverse document frequency of the ordered words of the corresponding titles and an inverse document frequency of the vectors of the ordered words of the corresponding titles, divided by the total number of words in a corresponding title; and identifying, by the microprocessor, based on the first group title similarity or the group second title similarity, one or more titles from the plurality of titles that match one or more search criteria and one or more Uniform Resource Locators (URLs) for the one or more identified titles.

Aspects of the above include a method, wherein the algorithm determines the first group title similarity.

Aspects of the above include a method, wherein the algorithm determines the second group title similarity.

Aspects of the above include a method, wherein the microprocessor, based on the first group title similarity or the second group title similarity identifies the one or more titles using a maximum weighted matching algorithm.

Aspects of the above include a method, wherein the one or more media sites comprises a plurality of media sites and further comprising:

extracting the plurality of titles by determining a plurality of different formats of the plurality of media sites; and storing the plurality of titles in a common format in a user profile interest database.

Aspects of the above include a method, wherein a user identifies at least one of the one or more media sites using a user interface.

Aspects of the above include a method, further comprising:

extracting the plurality of titles from the one or more media sites by searching for tags within documents that identify the plurality of titles.

Aspects of the above include a method, wherein the total number of words is a minimum number of words between two compared titles.

Aspects of the above include a method, wherein the crawling step runs on a first separate computer thread and/or computer core.

Aspects of the above include a method, wherein the removing and applying steps run on a second separate computer thread and/or computer core and the identifying step runs on a third separate computer thread and/or computer core.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

What is claimed is:

1. A system comprising:
a microprocessor; and
a non-transitory computer readable medium, coupled with the microprocessor and comprising microprocessor readable and executable instructions that program the microprocessor to execute:

a network crawler that crawls one or more media sites to extract a plurality of titles for information contained in the one or more media sites and store the plurality of titles in a database that is separate and apart form the one or more media sites;

a data processor that removes one or more stop words and/or high frequency words from the plurality of titles in the database and applies a minimum cost flow maximum algorithm to find a maximum sum weighted match between the plurality of titles in the database wherein one or more of the following is true:

(a) a first group title similarity that is measured between the plurality of titles using a sum of a cosine of a word2vec of ordered words and a word2vec of vectors of the ordered words between the corresponding titles, divided by a total number of words in a corresponding title; and (b) a second group title similarity that is measured considering an inverse document frequency wherein the second title similarity is measured between the plurality of titles using the sum of a cosine of a word2vec of ordered words and a word2vec of vectors of the ordered words between the corresponding titles, times a square root of an inverse document frequency of the ordered words of the corresponding titles and an inverse document frequency of the vectors of the ordered words of the corresponding titles, divided by the total number of words in a corresponding title; and a personalized news recommendation engine, that receives a search request from a communication device of a user defining search criteria comprising a specific type of title of news media for the user and that, based on the one or more of the first group title similarity and the second group title similarity, identifies one or more titles from the plurality of titles that match the search criteria and one or more Uniform Resource Locators (URLs) for the identified one or more titles and sends the identified one or more titles and the one or more URLs for the identified one or more titles to the communication device of the user.

2. The system of claim 1, wherein the algorithm determines the first group title similarity.

3. The system of claim 1, wherein the algorithm determines the second group title similarity.

4. The system of claim 1, wherein the personalized news recommendation engine, based on the one or more of the first group title similarity and the second group title similarity, identifies the one or more titles using a maximum weighted matching algorithm.

5. The system of claim 1, wherein the one or more media sites comprises a plurality of media sites and wherein the network crawler extracts the plurality of titles by determining a plurality of different formats of the plurality of media sites, converts the plurality of titles in the plurality of different formats into a common computer format, and stores the converted plurality of titles in the common computer format in a user profile for the user in a user profile interest database.

6. The system of claim 1, wherein the user identifies at least one of the one or more media sites using a user interface of the communication device.

7. The system of claim 1, wherein the network crawler extracts the plurality of titles from the one or more media sites by searching for tags within documents that identify the plurality of titles.

8. The system of claim 1, wherein the total number of words is a minimum number of words between two compared titles.

9. The system of claim 1, wherein the network crawler runs on a separate computer thread and/or computer core from the data processor and the personalized news recommendation engine.

10. The system of claim 9, wherein the data processor and the personalized news recommendation engine are both running on separate computer threads and/or computer cores.

11. A method comprising:
  crawling, by a microprocessor, one or more media sites to extract a plurality of titles for information contained in the one or more media sites;
  storing, by the microprocessor, the plurality of titles in a database that is separate and apart from the one or more media sites,
  removing, by the microprocessor, one or more stop words and/or high frequency words from the plurality of titles in the database;
  applying, by the microprocessor, a minimum cost flow maximum algorithm to find a maximum sum weighted match between the plurality of titles in the database wherein one or more of the following is true:
    (a) a first group title similarity that is measured between the plurality of titles using a sum of a cosine of a word2vec of ordered words and a word2vec of vectors of the ordered words between the corresponding titles, divided by a total number of words in a corresponding title; and
    (b) a second group title similarity that is measured considering an inverse document frequency wherein the second title similarity is measured between the plurality of titles using the sum of a cosine of a word2vec of ordered words and a word2vec of vectors of the ordered words between the corresponding titles, times a square root of an inverse document frequency of the ordered words of the corresponding titles and an inverse document frequency of the vectors of the ordered words of the corresponding titles, divided by the total number of words in a corresponding title;
  receiving, by the microprocessor, a search request from a communication device of a user defining search criteria comprising a specific type of title of news media for the user;
  identifying, by the microprocessor in response to receiving the search request and based on the one or more of the first group title similarity and the second group title similarity, one or more titles from the plurality of titles that match the search criteria and one or more Uniform Resource Locators (URLs) for the identified one or more titles; and
  sending, by the microprocessor, the identified one or more titles and the one or more URLs for the identified one or more titles to the communication device of the user.

12. The method of claim 11, wherein the algorithm determines the first group title similarity.

13. The method of claim 11, wherein the algorithm determines the second group title similarity.

14. The method of claim 11, wherein the microprocessor, based on the one or more of the first group title similarity and the second group title similarity, identifies the one or more titles using a maximum weighted matching algorithm.

15. The method of claim 11, wherein the one or more media sites comprises a plurality of media sites and further comprising:
  extracting, by the processor, the plurality of titles by determining a plurality of different formats of the plurality of media sites and converting the plurality of titles in the plurality of different formats into a common computer format; and
  storing, by the processor, the converted plurality of titles in the common computer format in a user profile in a user profile interest database.

16. The method of claim 11, wherein the user identifies at least one of the one or more media sites using a user interface of the communication device.

17. The method of claim 11, further comprising:
  extracting, by the processor, the plurality of titles from the one or more media sites by searching for tags within documents that identify the plurality of titles.

18. The method of claim 11, wherein the total number of words is a minimum number of words between two compared titles.

19. The method of claim 11, wherein the crawling step runs on a first separate computer thread and/or computer core.

20. The method of claim 19, wherein the removing and applying steps run on a second separate computer thread and/or computer core and the identifying step runs on a third separate computer thread and/or computer core.

* * * * *

UNITED STATES PATENT AND TRADEMARK OFFICE
CERTIFICATE OF CORRECTION

PATENT NO. : 10,747,833 B2
APPLICATION NO. : 15/797775
DATED : August 18, 2020
INVENTOR(S) : Fei Xiao et al.

Page 1 of 1

It is certified that error appears in the above-identified patent and that said Letters Patent is hereby corrected as shown below:

In the Claims

Claim 1, Column 14, Line 5, delete "form" and insert --from-- therein.
Claim 11, Column 15, Line 22, delete the "," and insert a --;-- therein.

Signed and Sealed this
Twenty-ninth Day of September, 2020

Andrei Iancu
*Director of the United States Patent and Trademark Office*